United States Patent

Locati

[15] 3,651,626
[45] Mar. 28, 1972

[54] POWER TRANSMISSION BELTS
[72] Inventor: Norman Carl Locati, Lake Oswego, Oreg.
[73] Assignee: Omark Industries, Inc., Portland, Oreg.
[22] Filed: Nov. 20, 1970
[21] Appl. No.: 91,289

Related U.S. Application Data

[63] Continuation-in-part of Ser. No. 759,831, Sept. 16, 1968, Pat. No. 3,545,188, and a continuation-in-part of Ser. No. 033,449, Apr. 30, 1970.

[52] U.S. Cl. .............................................................56/290
[51] Int. Cl. ..........................................................A01d 55/24
[58] Field of Search .............................56/290–292, 244 L, 56/245

[56] References Cited

UNITED STATES PATENTS

| 591,606 | 10/1897 | Martin | 56/290 |
| 3,397,524 | 8/1968 | Hofer | 56/290 |
| 3,545,188 | 12/1970 | Lucati | 56/245 |

Primary Examiner—Louis G. Mancene
Assistant Examiner—Gregory E. McNeill
Attorney—Robert L. Harrington

[57] ABSTRACT

A flexible reinforced power transmission belt having rigid connectors molded into the cutter belt at spaced intervals. A cutter element is pivotally connected to the protruding end of each connector. A compressed resilient pad between the belt and cutter element urges the cutter element in an extended position but is deformed in response to abnormal impact to permit pivoting of the cutter elements.

10 Claims, 4 Drawing Figures

Patented March 28, 1972
3,651,626
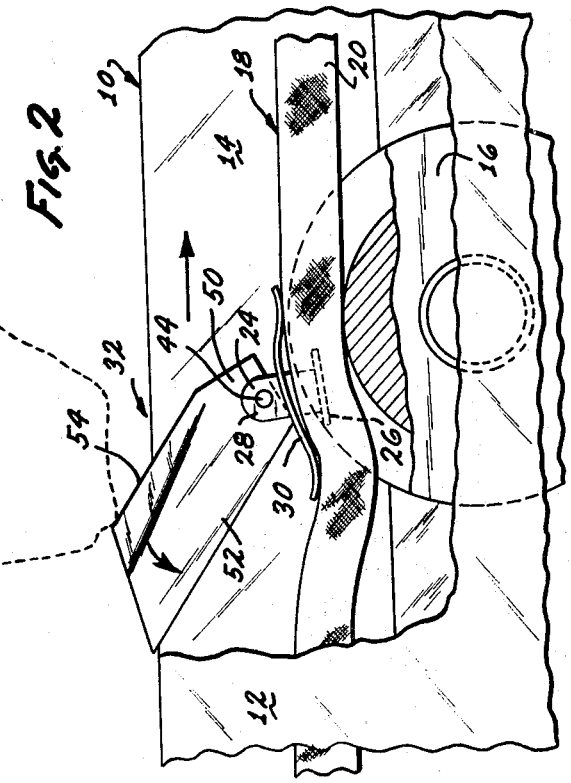
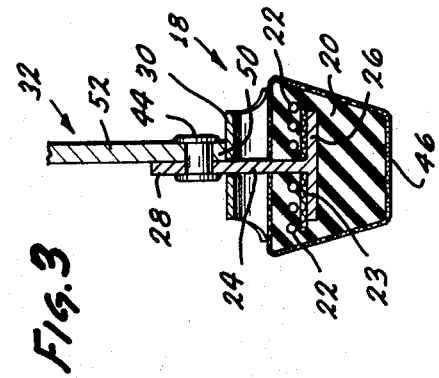
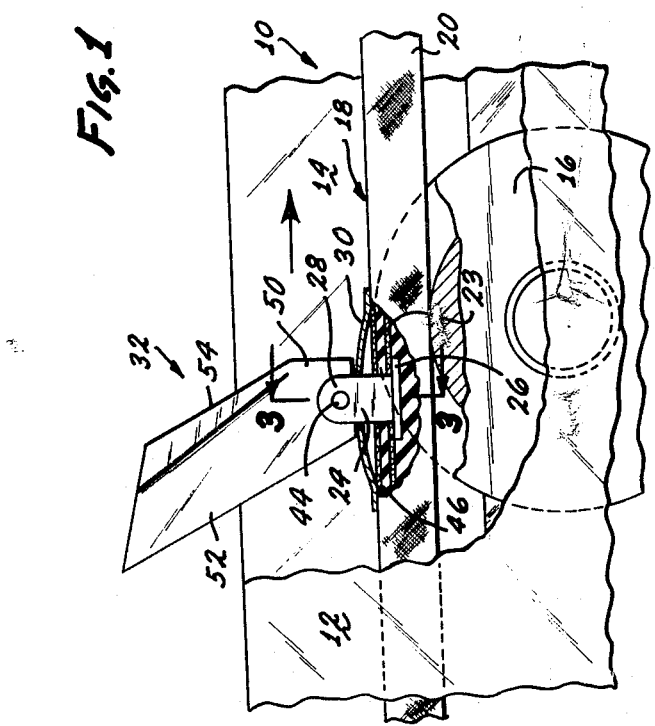
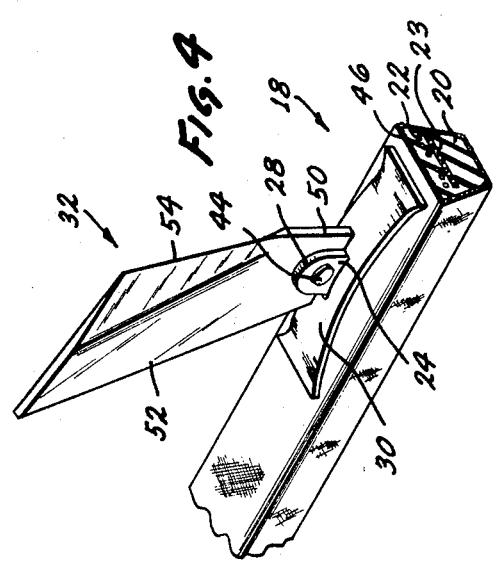
INVENTOR
NORMAN C. LOCATI
BY Robert L. Harrington
ATTORNEY

POWER TRANSMISSION BELTS

CROSS REFERENCES

This application is a continuation-in-part of applications for U.S. application Ser. No. 759,831 filed Sept. 16, 1968 now U.S. Pat. No. 3,545,188 and U.S. application Ser. No. 33,449 filed Apr. 30, 1970 pending.

HISTORY

This invention relates to a flexible belt having means for attaching rigid elements thereto such as cutter elements to be used in an impact mowing apparatus.

Impact mowing apparatus prior to this invention have performed satisfactorily under limited conditions. However, a commercially successful apparatus must be capable of long use under normal field conditions without requiring maintenance, It is estimated that the mower should be able to run undamaged for a total of about 250 hours while encountering various field hazards such as hidden rocks, posts, and the like.

A major problem in achieving the extended use life is in providing the required durability to the carrier belt. In prior cutter belt designs, slots are formed in the belt, and the keel of a connector is inserted through the slot and fastened. In operation the belt is continuously being flexed as it passes around the sheaves of the cutter bar. This flexing causes constant working of the keel in the slot and the belt quickly becomes worn and fails, well short of the 250 hours. A second problem is in providing an inexpensive reliable means for protecting the cutter elements when the mower bar strikes a solid object. The belt travels at very high speeds and a single impact can result in the breakage of many cutter elements.

The present invention substantially reduces wearing and breakage resulting from the causes described above and is believed to be a significant advance in the design of mower apparatus. In the preferred embodiment of the invention, T-shaped fasteners are molded into the carrier belt with the cross bar positioned close to the outer surface but below a layer of reinforcing filaments. At this position the flexing is the least effective for weakening the belt and yet provides a secure connection for elements desired to be carried by the belt. The cutter elements are pivotally connected to the protruding stem of the connector. A resilient pad is placed between the cutter element and belt to urge the cutter element in an extended position. Upon impact with a solid object the pad compresses and the cutter element folds back behind a guard rail of the cutter bar.

The advantages and improvements of the invention will be more apparent by reference to the following detailed description and drawings wherein:

FIG. 1 illustrates a cutter belt of the present invention mounted on a cutter bar of a mower apparatus with portions broken away for clarification;

FIG. 2 illustrates the cutter belt of FIG. 1 but showing the cutter element retracted behind the cutter bar as if striking a solid object;

FIG. 3 is a cross section of the cutter belt illustrating the carrier belt with connector molded therein; and FIG. 4 is a perspective view of the cutter belt illustrating the cutter element in position for cutting.

As illustrated in FIGS. 1 and 2 a cutter bar 10 for an impact mower apparatus includes a top plate 12 and a bottom plate 14 which encloses or houses a cutter belt driving and supporting mechanism of which sheave 16 is shown. The present invention is directed to the cutter belt 18 and the specifics of the cutter bar 10 are not shown. Reference is made to the commonly assigned U.S. Ser. No. 759,831 for a full disclosure of a suitable impact mower apparatus as would use a cutter belt of the present invention.

The V-belt or carrier belt 20 is generally constructed in a manner well known to the rubber products industry. Important differences are in the increased strength provided by the reinforcing filaments 22 and the T-connectors 24 which are molded into the belt. As shown in FIG. 3 the cross bar 26 of the T-connector 24 is embedded in the belt cross way to the length of the belt (and cross way to the filaments 22) and just below the filaments 22. Thus the cross bar and protruding stem 28 are embedded only in the upper portion of the belt. The least flexing occurs at the neutral axis of the belt (dictated at least in part by the location of the filaments 22) and thus with the cross bar adjacent the filaments 22 in the upper middle section of the belt there is a minimum of digging in or working of the rigid connector within the flexible belt. A blade 52 of cutter element 32 is pivotally connected to the stem 28 by a pin 44. A spring washer 30 through which the stem 28 is inserted, is abutted against a flat area on the end of the blade in a manner to maintain the blade in an extended position. When a hard object is struck, the blade 52 is folded against the spring biasing pressure of the spring washer behind the top plate 12 as illustrated in FIG. 2.

A more specific example follows:

The carrier belt 20 is a standard B section V-Belt having a single row of tensile cord members 22. There is a 0.030-inch-thick section of rubber stock separating the cords from the side wall of the jacket of the belt and a 0.050-inch-thick section between the row of cords and the top wall of the jacket. The tensile cord members are multiple strand polyester material with an aggregate tensile strength of at least 1,500 pounds. The belt jacket 46 is two ply nylon or dacron. The compounding of the belt includes fibre loading oriented to produce maximum torsional modulus.

The T-connector 24 is made of high carbon or alloy steel in a process that includes steps designed to prevent fatigue failure. The spacing along the belt between connectors is preferably 3 inches ±one-eighth inch. It is centered cross way in the belt ±0.005 inch and the dimension from the center line of the hole in the connector to the top surface of the belt is preferably held to ±0.003 inch. Also the stem of the connector must be perpendicular to the belt top surface within 1°. The cross bar of the connector is located as close as possible to the neutral axis of the belt. However a shock ply 23 of rubber impregnated fabric (nylon) about one-sixteenth inch thick is provided between the top of the cross bar 26 and the row of filaments 22.

The cutter element 32 is blanked and formed from 0.050-inch-thick steel. Great care is exercised to assure absence of nicks, cracks and other defects. They are heat treated to Rc 51–54 and shot peened to further improved fatigue resistance. The blade portion is provided with a 0.0005 inch hard chrome plate for additional abrasive wear resistance. The blade angle, i.e., cutting edge 54 from the base portion 50 of the cutter element is 47° and the plane defined by the blade 52 of the cutter element is offset 10° from the base portion.

FIG. 1 illustrates the cutter belt in operation. The cutter elements are fastened to the belt at about three inch intervals. The belt is driven at a linear speed of about 6,000 to 8,000 feet per minute with the blade 52 of the cutter element protruding past the cutter bar about 1 inch. The distance from the pivot pin 44 to the front edge of the cutter bar is no less than the shortest distance of the pivot pin 44 to the cutting edge 54. Thus it will be seen from FIG. 2 that by pivoting the cutter element rearwardly (by deforming the spring washer 30 as shown) the cutter element can be retracted behind the front edge of the cutter bar.

The retraction, depending on the stiffness of the spring washer requires a substantial force that is not achieved by the impact occurring in a normal mowing operation. However when a foreign object such as a rock, fence post or the like is encountered, the blade is pivoted back as shown. The construction has been tested and found to effectively provide the safety features necessary to avoid undesirable break down heretofore experienced when blades were broken upon striking such foreign objects.

Although we do not wish to be bound by this theory, it is believed that the construction as described above, performs far better than previous known structures for a variety of reasons. The offset which enables the blade to be sharpened also causes an upward thrust of the severed material to clear the cutter bar and avoid clogging. Also this offset establishes the center of gravity of the cutter element over the center of the belt and the stem of the connector. This avoids a twisting force that can be created when the belt spins around the reverse pulley. The significance of this force will be apparent when considering the high speed at which the belt travels.

As previously mentioned the spring washer 30 is put under compression in fastening the cutter element to the T-connector. It follows that the portion of the belt above the cross bar of the T-connector is also under compression. With the belt under compression the rocking force produced when striking an object (see FIG. 2) which tends to pull the forward portion of the cross bar loose of its bond with the rubber stock of the belt is cancelled. In experimentation, when the bond is broken the attrition that follows very quickly wears out the belt. It is also believed that the increased compression at the rearward end of the spring washer during impact creates additional friction gripping of the upper portion of the belt, containing the tensile cords, which inhibits slipping of the T-connector and spring pad rearwardly on the belt. Such slipping is undesirable in that wearing would then occur much more rapidly.

The above description is set forth for purposes of illustration only. Many variations will be apparent to those skilled in the art and it is not intended to limit the scope of the invention to the illustrations.

Having thus described my invention what I claim is:
What is claimed is:

1. A power transmission belt adapted to be driven by a drive pulley comprising a molded elastomeric material, a flexible jacket confining said elastomeric material to define an elongated belt member, a connector having one end molded into the elastomeric material, said one end terminating in the belt at the approximate neutral axis of the belt, a second end extended through the jacket to the exterior of the belt member, and means for connecting a work piece to the connector.

2. A power transmission belt as defined by claim 1 wherein the said one end of the connector forms a cross bar, and including a row of reinforcing filaments in the elastomeric material between the cross bar and said second end of the connector to inhibit removal of the connector from the belt.

3. A cutter belt adapted to be driven by a drive pulley comprising a carrier belt, a connector securely fastened to the belt, a cutter element pivotally connected to the connector, and a compressed resilient pad urging the cutter element in an extended position.

4. A cutter belt as defined by claim 3 wherein the resilient pad is a spring washer between the belt and the cutter element.

5. A cutter belt as defined by claim 3 wherein the connector is provided with a cross bar at one end, said one end being molded in the belt the approximate neutral axis of the belt.

6. A cutter belt as defined by claim 5 wherein the carrier belt is a V-Belt, the connector having its other end protruding through the top of the V-Belt and reinforcing filaments in the belt between the cross bar and the top of the belt.

7. A cutter belt as defined by claim 3 wherein the cutter element has a blade portion, said blade portion defining a plane that is angularly offset from the longitudinal axis of the carrier belt, said angular offset provided to center the center of gravity of the cutter element substantially over the longitudinal axis of the carrier belt.

8. For use on an impact cutting mower apparatus having a cutter bar with drive and reverse sheaves and front and rear idler sheaves all of which are adapted for mounting a driven cutter belt, a cutter belt comprising; a flexible carrier belt formed from a reinforced V-belt, rigid cutter elements fastened to said carrier belt, said cutter elements having a keel inserted into the carrier belt, a blade pivotally connected to the keel, and releasable supporting means supporting the blade in an extended position, said supporting means being released by an impact force produced when the blade strikes a solid object.

9. A power transmission belt adapted to be driven by a drive pulley comprising a molded elastomeric material, a flexible jacket confining said elastomeric material to define an elongated belt member, a connector having a stem and cross bar, said connector being securely fastened to the belt member with one end of the stem terminating in the belt at the approximate neutral axis of the belt, the cross bar fastened to said one end having dimensions transverse to the stem substantially greater than the cross section of the stem; the other end of the stem of the T-connector extended through the jacket to the exterior of the belt member, and means for connecting a work piece to the connector.

10. A power transmission belt adapted to perform other work in addition to its normal function of power transmission comprising a carrier belt, a working element, fastening means to fasten the working element to the carrier belt, and a compressed resilient pad between the working element and carrier belt to maintain the fastening means in tension.

* * * * *